United States Patent
Lerner

(10) Patent No.: US 10,931,674 B2
(45) Date of Patent: Feb. 23, 2021

(54) DETECTING WHETHER TO IMPLEMENT ONE OR MORE SECURITY MEASURES ON A SHARED RESOURCE

(71) Applicant: PayPal, Inc., San Jose, CA (US)

(72) Inventor: Brandon Scott Lerner, Scarsdale, NY (US)

(73) Assignee: PAYPAL, INC., San Jose, CA (US)

( * ) Notice: Subject to any disclaimer, the term of this patent is extended or adjusted under 35 U.S.C. 154(b) by 211 days.

(21) Appl. No.: 15/967,531

(22) Filed: Apr. 30, 2018

(65) Prior Publication Data
US 2019/0334903 A1    Oct. 31, 2019

(51) Int. Cl.
| | | |
|---|---|---|
| *H04L 29/06* | (2006.01) | |
| *H04L 29/08* | (2006.01) | |
| *G06Q 30/02* | (2012.01) | |

(52) U.S. Cl.
CPC ......... *H04L 63/10* (2013.01); *G06Q 30/0269* (2013.01); *H04L 63/20* (2013.01); *H04L 67/146* (2013.01); *H04L 67/22* (2013.01); *H04L 67/306* (2013.01)

(58) Field of Classification Search
CPC ......... H01L 63/10; H01L 63/20; H01L 67/16; H01L 67/22; H01L 67/306; G06Q 30/0269
See application file for complete search history.

(56) References Cited

U.S. PATENT DOCUMENTS

| | | | | |
|---|---|---|---|---|
| 6,438,704 | B1 * | 8/2002 | Harris | G06F 9/4881 710/58 |
| 9,300,753 | B2 * | 3/2016 | Holden | G06F 9/5083 |
| 9,497,136 | B1 * | 11/2016 | Ramarao | G06F 9/45558 |
| 9,516,053 | B1 * | 12/2016 | Muddu | G06K 9/2063 |
| 2005/0228948 | A1 * | 10/2005 | Mikuma | G06F 3/0605 711/114 |
| 2007/0156696 | A1 * | 7/2007 | Lim | G06F 21/6218 |
| 2008/0015878 | A1 * | 1/2008 | Feng | G06Q 30/02 705/1.1 |
| 2009/0006627 | A1 * | 1/2009 | Castellucci | H04L 12/403 709/226 |
| 2009/0070454 | A1 * | 3/2009 | McKinnon, III | H04L 47/808 709/224 |
| 2010/0077449 | A1 * | 3/2010 | Kwok | G06F 9/5027 726/3 |
| 2011/0238478 | A1 | 9/2011 | Gottfurcht et al. | |
| 2011/0307890 | A1 * | 12/2011 | Achilles | G06F 9/505 718/100 |
| 2012/0005215 | A1 * | 1/2012 | Chow | G06Q 50/01 707/748 |
| 2012/0271908 | A1 * | 10/2012 | Luna | G06F 9/5016 709/216 |

(Continued)

*Primary Examiner* — Techane Gergiso
(74) *Attorney, Agent, or Firm* — Haynes and Boone, LLP

(57) ABSTRACT

A computer system identifies that a user activity on a user device during a first time period corresponds to a first user activity profile. The computer system monitors user activity on a user device during a second time period. The computer system determines that the user activity associated with the second time period does not correspond to the first user activity profile. In response to the determining that the user activity associated with the second time period corresponds to the second user activity profile, the computer system implements one or more security measures.

19 Claims, 5 Drawing Sheets

(56) References Cited

U.S. PATENT DOCUMENTS

| | | | |
|---|---|---|---|
| 2013/0239114 A1* | 9/2013 | Dinker | G06F 9/5011 |
| | | | 718/104 |
| 2013/0305083 A1* | 11/2013 | Machida | H04L 69/40 |
| | | | 714/4.1 |
| 2014/0067453 A1* | 3/2014 | Bufi | G06Q 10/10 |
| | | | 705/7.16 |
| 2014/0122706 A1* | 5/2014 | Boerner | H04L 41/12 |
| | | | 709/224 |
| 2014/0215602 A1* | 7/2014 | Chuaprasort | H04L 63/0876 |
| | | | 726/20 |
| 2014/0226609 A1* | 8/2014 | Hooli | H04W 72/042 |
| | | | 370/329 |
| 2014/0240122 A1 | 8/2014 | Roberts et al. | |
| 2014/0366150 A1* | 12/2014 | Fang | H04L 63/101 |
| | | | 726/26 |
| 2019/0028504 A1* | 1/2019 | Shtar | H04L 63/10 |
| 2019/0034849 A1* | 1/2019 | Romaine | G06F 3/04842 |

\* cited by examiner

DETECTING WHETHER TO IMPLEMENT ONE OR MORE SECURITY MEASURES ON A SHARED RESOURCE

TECHNICAL FIELD

The present disclosure relates to shared resources, and more particularly to identifying if certain security measures need to be implemented on a shared resource.

BACKGROUND

The ever-increasing amount of use of computing devices has led to a huge amount of data being collected by companies of all types. In certain cases, such as when a website is visited, a preference is changed, or a user has logged in, a cookie is created and stored, which may be utilized by the user device at a later time in order to achieve the objectives mentioned above. However, if a user is utilizing a shared resource, such as computer at a library, potentially valuable user information may be susceptible based on user cookies being accessible to another user of the shared resource.

DETAILED DESCRIPTION

Embodiments of the present disclosure provide a system, method, and program product. A computer system identifies that a user activity on a user device during a first time period corresponds to a first user activity profile. The computer system monitors user activity on a user device during a second time period. The computer system determines that the user activity associated with the second time period does not correspond to the first user activity profile. In response to the determining that the user activity associated with the second time period corresponds to the second user activity profile, the computer system implements one or more security measures.

In further embodiments, a computer system monitors user activity on a user device. The computer system determines that the user activity corresponds to a first user activity profile. In response to the determining that the user activity corresponds to the first user activity profile, the computer system determines an information that corresponds to the first user activity profile. The computer system causes transmission of the information to the user device.

In the example embodiment, the present disclosure describes a solution that monitors user activity on a computing device, such as a shared resource, and determines if the user activity corresponds to a user activity profile stored in memory. If the user activity does correspond to a user activity profile stored in memory, the solution provides an advertisement that corresponds to the user activity profile. If the user activity does not correspond to a user activity profile stored in memory, the solution creates a new user activity profile based on the monitored user activity.

Furthermore, in further embodiments, the present disclosure describes a solution that monitors user activity on a computing device, such as a shared resource, and determines if the monitored user activity corresponds to a different user activity profile (i.e., determines if the user activity denotes that there may have been a change in users), and based on determining that the monitored user activity corresponds to a different user activity profile, will take security measures to make sure that a new user does not gain access to any sensitive information associated with a previous user.

Embodiments of the present disclosure will now be described in detail with reference to the accompanying Figures.

Figure 1:
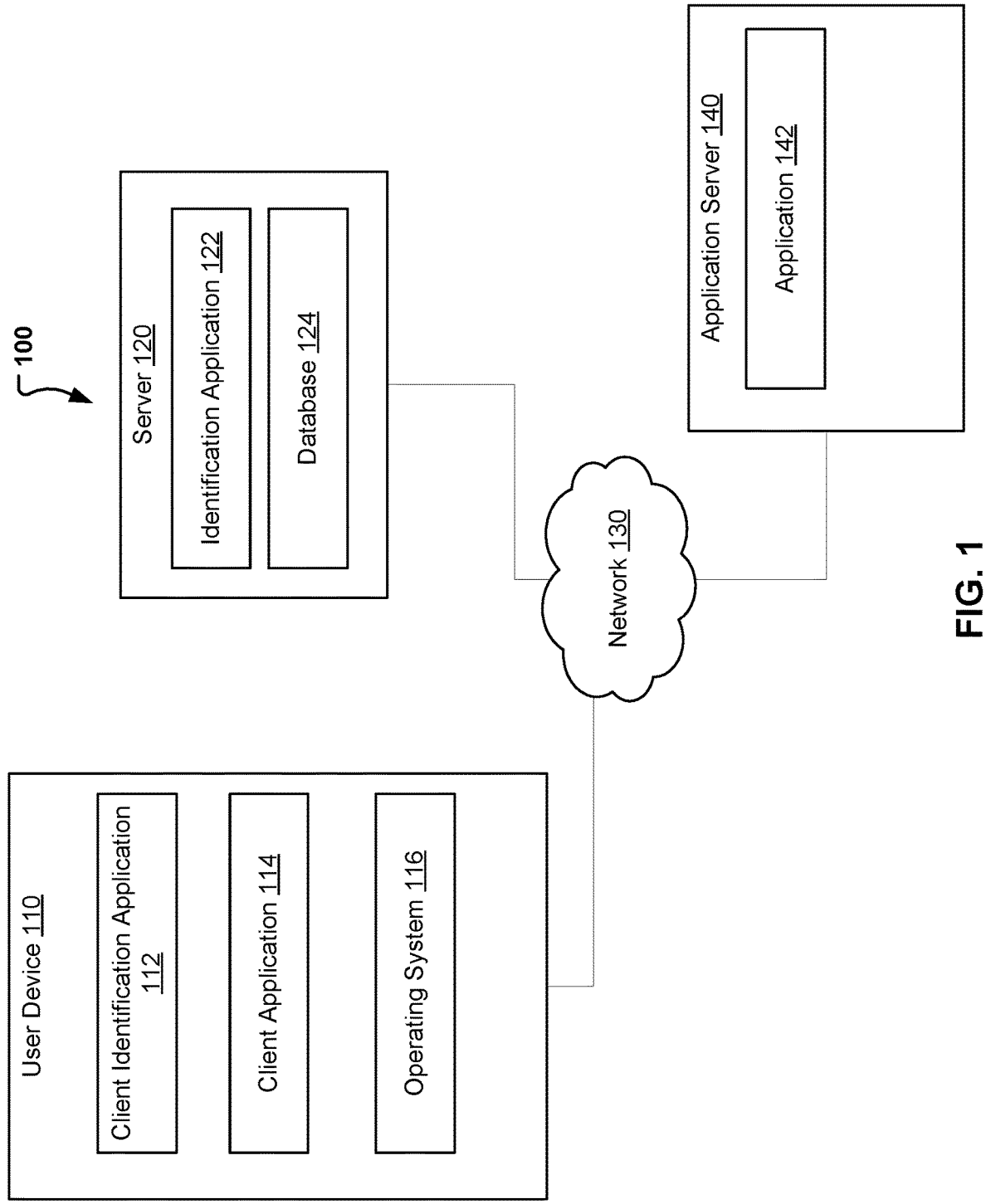
FIG. 1 illustrates an identification system, in accordance with an embodiment.

FIG. 1 illustrates identification system 100, in accordance with an embodiment. In the example embodiment, identification system 100 includes user device 110, server 120, and application server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between user device 110 and server 120.

In the example embodiment, application server 140 includes application 142. In the example embodiment, application server 140 may be a desktop computer, a laptop computer, a tablet computer, a mobile device, a handheld device, a thin client, or any other electronic device or computing system capable of receiving and sending data to and from other computing devices, such as user device 110, via network 130. Furthermore, in the example embodiment, application server 140 is a computing device that is optimized for the support of application 142, and for the support of network requests related to application 142. Although not shown, optionally, application server 140 can comprise a cluster of servers executing the same software to collectively process requests as distributed by a front-end server and a load balancer. Application server 140 is described in more detail with regard to the figures below.

In the example embodiment, application 142 is a server side application that communicates with one or more client side applications, such as client application 114. For example, application 142 may be a payment application, a social media application, or any other type of application. Application 142 is described in more detail with regard to the figures below.

In the example embodiment, user device 110 includes client identification application 112, client application 114, and operating system 116. In the example embodiment, user device 110 may be a desktop computer, a laptop computer, a tablet computer, a mobile device, a handheld device, a thin client, or any other electronic device or computing system capable of receiving and sending data to and from other computing devices, such as application server 140, via network 130. User device 110 is described in more detail with reference to the figures below.

In the example embodiment, client identification application 112 is a client side application of server-side identification application 122. In the example embodiment, client identification application 112 is capable of monitoring user activity on user device 110, and further capable of transmitting information corresponding to the monitored user activity to identification application 122. Furthermore, client identification application may communicate with operating system 116 in order to obtain certain user activity information (such as hardware inputs). Client identification application 112 is described in more detail with regard to the figures below.

In the example embodiment, client application 114 is a client-side application of server-side application 142. In the example embodiment, client application 114 is capable of transmitting requests and communicating with server-side application 142. Client application 114 is describes in more detail with regard to the figures below.

In the example embodiment, operating system 116 is system software that manages computer hardware and software resources present on user device 110. Operating system 112 is described in further detail with regard to the figures.

In the example embodiment, server 120 includes identification application 122 and database 124. In the example embodiment, server 120 may be a desktop computer, a laptop computer, a tablet computer, a mobile device, a handheld device, a thin client, or any other electronic device or computing system capable of receiving and sending data to and from other computing devices, such as user device 110, via network 130. Although not shown, optionally, server 120 can comprise a cluster of servers executing the same software to collectively process requests as distributed by a front-end server and a load balancer. Server 120 is described in more detail with regard to the figures.

In the example embodiment, database 124 is a storage device that includes information corresponding to one or more user activity profiles and further includes user activity information that corresponds to each of the one or more user activity profiles. In the example embodiment user activity information in database 124 may include monitored activity corresponding to hardware inputs (i.e., scrolling speeds, typing speeds, heat map of mouse location, etc.), monitored activity corresponding to software usage patterns, monitored activity corresponding CPU usage levels (such as memory usage levels), and/or other types of monitored activity that corresponds to one or more device usage patterns. Additionally, in one or more embodiments, database 124 may include specific advertisements or offers (or links to specific advertisements or offers) that correspond to at least a portion of the one or more user activity profiles. Further, in one or more embodiments, database 124 may include additional information that may correspond to at least a portion of the one or more user activity profiles, such as preference/settings information. Database 124 is described in further detail with regard to the figures.

In the example embodiment, identification application 122 is a server side application that corresponds to one or more client-side identification applications, such as client identification application 112. In the example embodiment, identification application 122 is capable of utilizing client identification application 112 to detect user activity information. In other embodiments, identification application 122 may communicate directly with operating system 116 via network 130, to monitor and detect user activity information. Furthermore, identification application 122 is capable of determining if the detected user activity information corresponds to a stored user activity profile, and if so, is further capable of providing an advertisement to the user that corresponds to the user activity profile. In other embodiments, identification application 122 may provide a different type of information (to the user) that corresponds to the user activity profile. In addition, identification application 122 is capable of determining if a detected pattern of user activity corresponds to a change in users, and if so, identification application 122 is further capable of taking one or more security measures. Identification application 122 is described in further detail with regard to the figures below.

Figure 2:
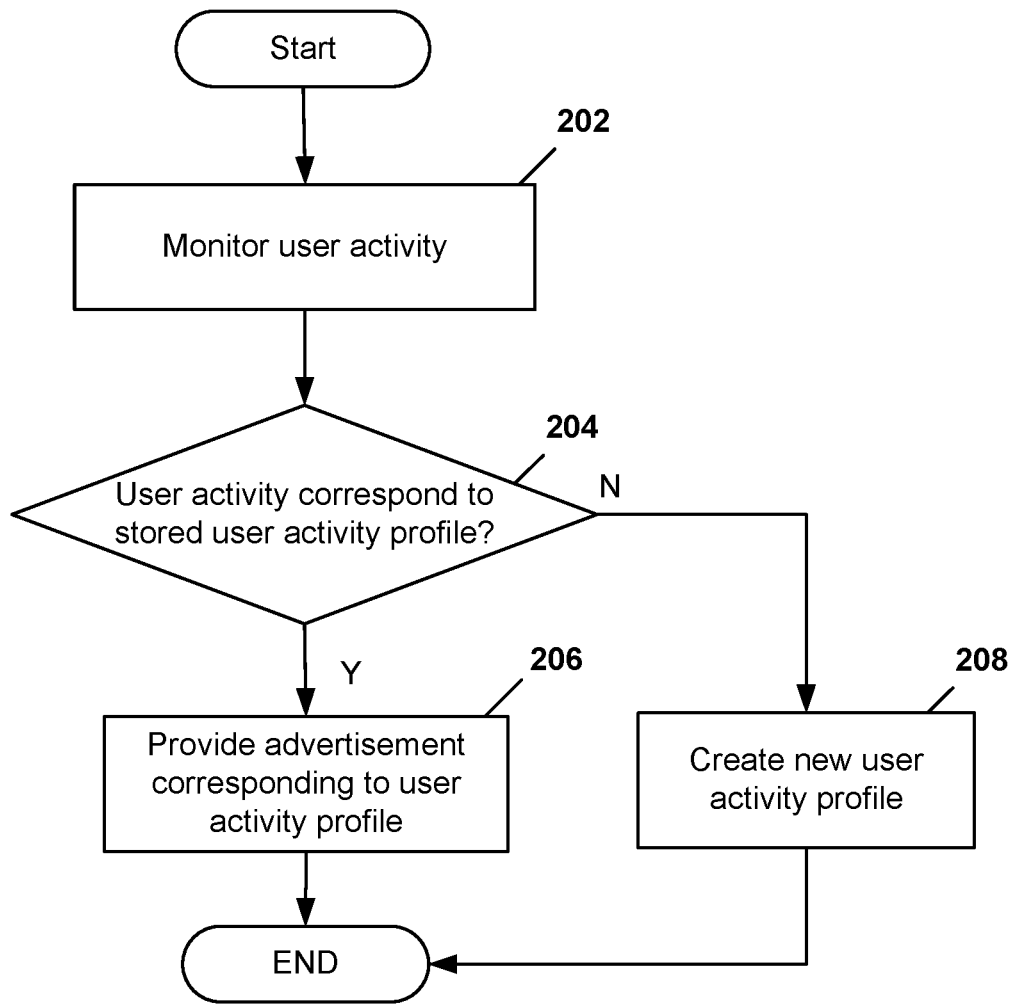
FIG. 2 is a flowchart illustrating the operations of the identification application of FIG. 1 in detecting if user activity corresponds to a stored user activity profile, and based on the detecting, determining an advertisement to present to the user, in accordance with an embodiment.

FIG. 2 is a flowchart illustrating the operations of identification application 122 in detecting if user activity corresponds to a stored user activity profile, and based on the detecting, determining an advertisement to present to the user, in accordance with an embodiment. In the example embodiment, FIG. 2 describes the operations of identification application 122 in identifying a user by monitoring and analyzing user activity, and further, without requiring the user to provide any personal information or login credentials.

In the example embodiment, identification application 122 monitors user activity on user device 110 (step 202). In the example embodiment, identification application 122 may utilize client identification application 112 to identify user activity information such as hardware inputs (scrolling speeds, mouse heat map locations, typing speed, etc.), software usage patterns, and CPU usage levels (such as memory usage levels). In the example embodiment, client identification application 112 may communicate with operating system 116 in order to obtain and monitor user activity information. For example, client identification application 112 may monitor user activity (via operating system 116) locally on user device 110 and may then transmit the user activity information to identification application 122 via network 130 periodically (such as every 30 seconds, every minute, or every hour). In other embodiments, as stated above, identification application 122 may communicate directly with operating system 116 in order to obtain and monitor/analyze user activity corresponding to user device 110. In one or more embodiments, identification application 122 may additionally identify additional user activity information such as identify the amount of time that is spent on specific pages. In one example, the amount of time spent on a specific screen may be utilized by identification application 122 to identify a reading comprehension level of a user.

In the example embodiment, identification application 122 determines if the monitored user activity corresponds to a user activity profile stored in database 124 (decision 204). In the example embodiment, identification application 122 may determine if the monitored user activity exceeds a threshold level of similarity (such as a threshold similarity score) to a specific user activity profile of one or more user activity profiles stored in database 124. Furthermore, in the example embodiment, each particular user activity may have an associated weighted score, which may be utilized in determining if the threshold level of similarity has been exceeded. For example, if identification application 122 determines that a scrolling speed, a typing speed associated with a user of user device 110 correspond to a first user activity profile, identification application may determine a similarity score utilizing the weights associated with each user activity (such as scrolling speed and typing speed), and determine if the similarity score exceeds a threshold similarity score.

If identification application 122 determines that the monitored user activity does not correspond to a user activity profile stored in database 124 (decision 204, "NO" branch), identification application 122 creates a new user activity profile in database 124 (step 208). In the example embodiment, identification application 122 associates the new user activity profile in database 124 with one or more of the monitored user activities. As stated above, the monitored user activities may include monitored activity corresponding to hardware inputs (i.e., scrolling speeds, typing speeds, heat map of mouse location (identifying movements and locations associated with the mouse), etc.), monitored activity corresponding to software usage patterns, monitored activity corresponding CPU usage levels (such as memory usage levels), and/or other types of monitored activity that corresponds to one or more device usage patterns. Furthermore, in or more embodiments, identification application 122 may store settings and preference information into database 124, in association with the new user activity profile.

If identification application 122 determines that the monitored user activity does correspond to a user activity profile stored in database 124 (decision 204, "YES" branch), identification application 122 may provide an advertisement corresponding to the stored user activity profile (step 206). In other embodiments, identification application 122 may perform additional or alternative steps such as adjusting preferences or settings on user device 110 to correspond to preferences or setting associated with the stored user activity profile, or provide an offer, or information, other than an advertisement to the user of user device 110. For example, identification application 122 may provide suggestions on how to optimize the utilization of a browsing experience based on the stored user activity profile (and in some cases the monitored user activity) including a specific web-browsing pattern, or how to optimize the utilization of an application experience, such as an experience corresponding to client application 114. In another example, identification application 122 may automatically create or provide suggestions on creating shortcuts for launching multiple applications in unison, based on the stored user activity profile (and in some cases the monitored user activity) including a usage pattern corresponding to the launching of multiple applications.

In further embodiments, database 124 may include categories or interests associated with each stored user activity profile, in which case, identification application 122 may transmit the category or interest information to a third party server via network 130. The third party server may then consume the category or interest information and identify a relevant advertisement or offer and provide the advertisement or offer to the user of user device 110. Alternatively, rather than transmitting the category or interest information to a third party server, identification application 122 may cross-reference the category or interest information with an advertisement or offer database to identify an advertisement or offer that corresponds to the category or interest information. In this alternative embodiment, after identifying the relevant advertisement or offer, identification application 122 may then provide the advertisement or offer to the user of user device 110. Furthermore, in one or more embodiments, providing the advertisement or offer to the user of user device 110 may include transmitting the advertisement or offer to client identification application 112, which may then utilize an application-programming interface (API) to communicate the advertisement or offer to client application 114 for display to the user of user device 110. Alternatively, identification application 122 may communicate the advertisement or offer directly to client application 114 for display to the user of user device 110.

Figure 3:
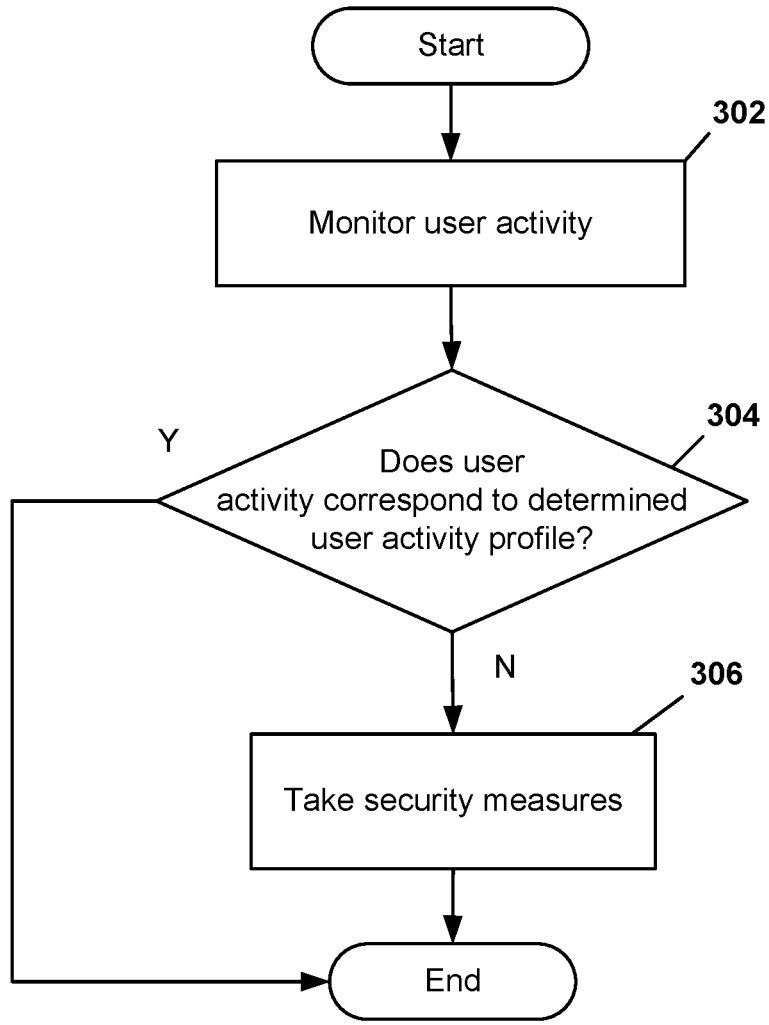
FIG. 3 is a flowchart illustrating the operations of the identification application of FIG. 1 in detecting if user activity is in alignment with a previously determined user activity profile, and based on the detecting, determining whether the take one or more security measures, in accordance with an embodiment.

FIG. 3 is a flowchart illustrating the operations of identification application 122 in detecting if monitored user activity is in alignment with a previously determined user activity profile, and based on the detecting, determining whether the take one or more security measures, in accordance with an embodiment. In the example embodiment, FIG. 3 describes the operations of identification application 122 in determining if a change in user has occurred (for example at a shared resource), by monitoring and analyzing user activity, and further without requiring any personal information or login credentials to be input.

In the example embodiment, as discussed above with regard to FIG. 2, identification application 122 may monitor user activity, and may further determine if the monitored user activity corresponds to a user activity profile in database 124. For example, identification application 122 may determine that the monitored user activity corresponds to a first user activity profile in database 124 or alternatively create a new user activity profile (which may then be stored in database 124). In the example embodiment, the term "previously determined user activity profile" may refer to the determined user activity profile previously stored in database 124 (i.e., the first user activity profile) or the newly created user activity profile.

In the example embodiment, identification application 122 may further continue monitoring user activity on user device 110, in a similar manner as described above, to identify if there are any changes to the user activity (step 302). Furthermore, in the example embodiment, identification application 122 may determine if the current monitored user activity corresponds to the previously determined user activity profile in database 124 (decision 304). In the example embodiment, the current monitored user activity may correspond to a period of time that is greater than a threshold period of time. For example, the threshold period of time may be 30 seconds, 1 minute, 2 minutes, 5 minutes, or another period of time. Furthermore, in one or more embodiments, user activity may be divided into sections based on a trigger event. For example, if identification application 122 detects a change in a scrolling speed (when a scrolling speed component associated with the previously determined user activity profile), identification application 122 may continue monitoring the user activity for the threshold period of time, and further compare the monitored user activity to the previously determined user activity profile as described above. In this example, the trigger event would be the detection in the change of scrolling speed.

If identification application 122 determines that the monitored current user activity on user device 110 does correspond to the previously determined user activity profile (decision 304, "YES"), identification application 122 continues to monitor user activity on user device 110. For example, upon monitoring and analyzing current user activity on user device 110, identification application 122 may determine that the level of similarity between the monitored user activity and the previously determined user activity profile exceeds the threshold level/score, and may therefore determine that the current user activity corresponds to the previously determined user activity profile.

If identification application 122 determines that the monitored current user activity on user device 110 does not correspond to the previously determined user activity profile (decision 304, "NO" branch), identification application 122 may take one or more security measures (step 306). For example, upon monitoring and analyzing current user activity on user device 110, identification application 122 may determine that the level of similarity between the monitored current user activity and the previously determined user activity profile does not exceed the threshold level/score, and may therefore determine that the current user activity does not correspond to the previously determined user activity profile. Furthermore, in or more embodiments, identification application 122 may also access database 124 and determine if the current user activity corresponds to another (a second) user activity profile in database 124. In other words, identification application 124 may determine that the level of similarity (similarity score) between the current user activity and the second user activity profile exceeds the threshold level/score. In summation, in determining whether the monitored current user activity corresponds to the previously determined user activity profile, identification application 122 may: 1) determine if the level of similarity between the monitored current user activity and the previously determined user activity profile exceeds the threshold level/score, 2) determine if the level of similarity between the monitored current user activity and another (second) user activity profile exceeds the threshold level/score, or both.

In the example embodiment, identification application 122 may then take one or more security measures to protect personal information or sensitive information of a user from being available to another user. In the example embodiment, if identification application 122 determines that the current user activity does not correspond to the previously determined user activity profile, an assumption can be made that the current user may be a new user. For example, for a shared resource, such as a computing device in a library, the computing device may be utilized by multiple different users every day or even every hour. Identification application 122 may utilize the techniques described above, to identify if there has been a change in users, and upon making the identification, may take one or more security measures to protect personal or sensitive information of a previous user from being available to a subsequent user. In the example embodiment, the one or more security measures may include deleting cookies associated with a web browser or application, such as client application 114. Furthermore, identification application 122 may transmit a request to an application server, such as application server 140, to delete any server-side cookies that may be present in association with user device 110. Furthermore, the one or more security measures may include automatically logging out of open applications, such as client application 114, or requesting re-authorization for applications that may have been previously authorized. In addition, in one or more embodiments, the one or more security measures may include readjusting settings/preferences back to default settings/preferences. In addition, the one or more security measures may include deleting one or more files that have been stored during a time period corresponding to the previously determined activity profile. In other words, identification application 122 may identify a time period in which the user activity corresponded to the previously determined user profile, and may identify if any files have been stored on user device 110 during that time period. Identification application 122 may further analyze the file type in determining whether to delete the one or more files (i.e., a word document may be deleted; an application update may not be deleted).

In addition, in the example embodiment, one or more files that have been deleted, may be recoverable by completing one or more challenges. For example, the user may be required to input credential information or answer one or more security questions (provide re-authorization credentials. Furthermore, in one or more embodiments, preferences and settings may be restored upon completion of the one or more challenges.

Furthermore, in additional embodiments, if identification application 122 determines that an application, such as client application 114 is open (and has been open throughout the change in monitored user activity), identification application 122 may analyze the information being currently displayed within client application 114, and further may utilize natural language processing techniques to identify if at least a portion of the information being currently displayed includes sensitive information. If identification application 122 determines that sensitive information is currently being displayed within client application 114, identification application 122 may hide the sensitive information, or may overlay over the sensitive information to conceal the information. Alternatively, identification application 122 may identify the portions of the source code that correspond to sensitive information and may purge or hide the portion of source code to conceal the sensitive information. In this additional embodiment, identification application may communicate with client identification application 112 (which may in turn communicate with operating system 116) in order to determine if client application 114 is open. Furthermore, identification application 122 may instruct client identification application 112 to perform one or more steps to conceal any identified sensitive information.

Overall, in one or more embodiments, identification application 122 may instruct client identification application 112 to perform any of the one or more security measures discussed above.

Figure 4:
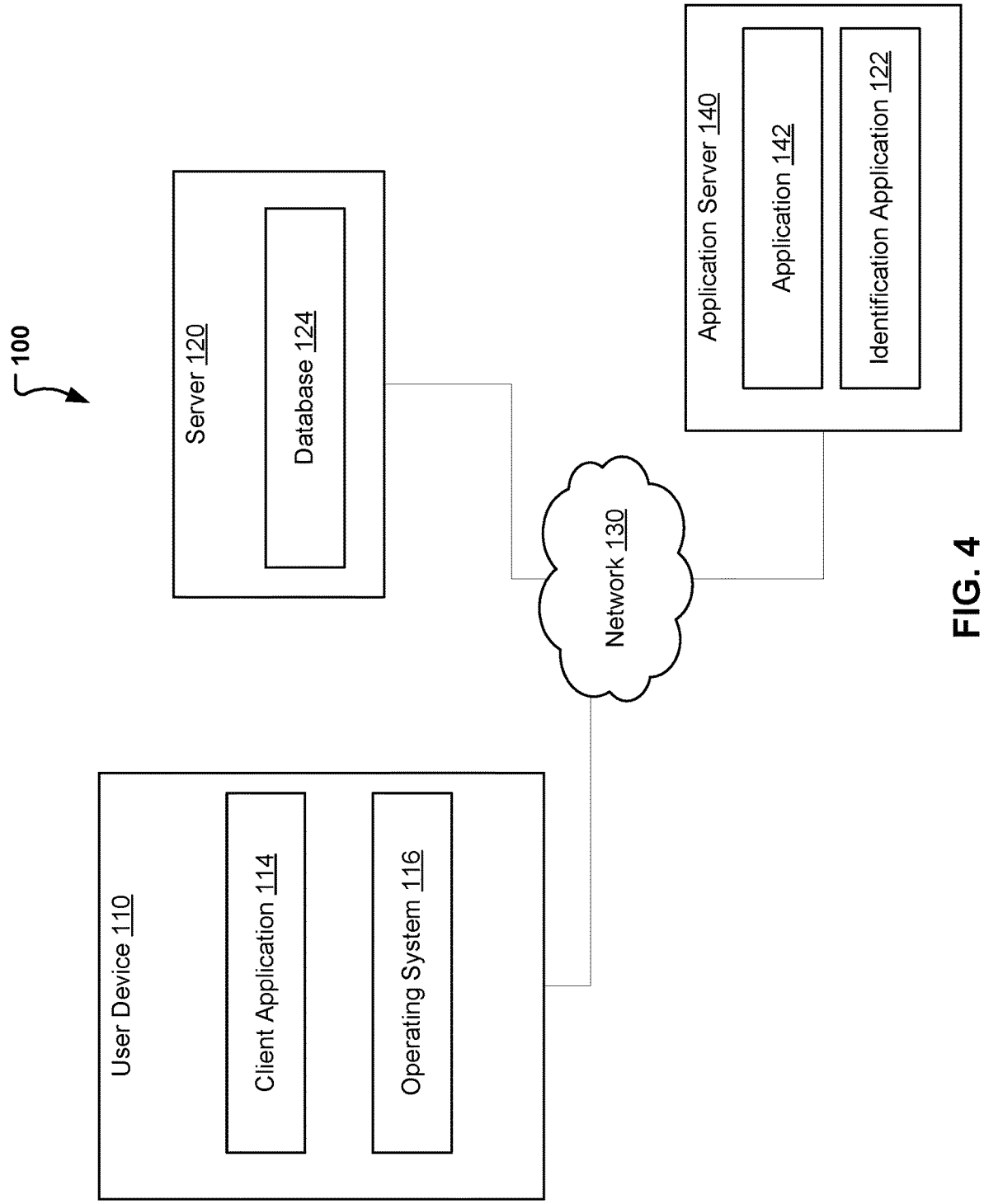
FIG. 4 illustrates an alternate embodiment of the identification system of FIG. 1, in accordance with an embodiment.

FIG. 4 illustrates an alternate embodiment of the identification system of FIG. 1, in accordance with an embodiment. In the example embodiment, FIG. 4 depicts an identification system 400 where identification application 122 is located on application server 140. In the example embodiment, identification application 122 may be partially or fully integrated with application 142, and further may monitor user activity on user device 110 via network 130. For example, if application 142 is a financial application, upon detection that the user of user device 110 has opened client application 114, identification application 122 may utilize one or more of the techniques described above to monitor user activity on user device 110 while client application 114 remains open. Therefore, upon initial launch, identification application 122 may determine that current user activity on user device 110 corresponds to a first user activity profile stored in database 124. However, if at a later time, identification application 122 determines that the current user activity has changed and now corresponds to a second user activity profile, identification application 122 may take one or more security measures as described above. In the example embodiment, identification application 122 may take the one or more security measures with respect to application 142 (i.e., delete cookies on user device 110 corresponding to application 142, hide/overlay sensitive information being displayed on client application 114, etc.). In other embodiments, the one or more security measures may be taken with respect to other applications located on user device 110 as well.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
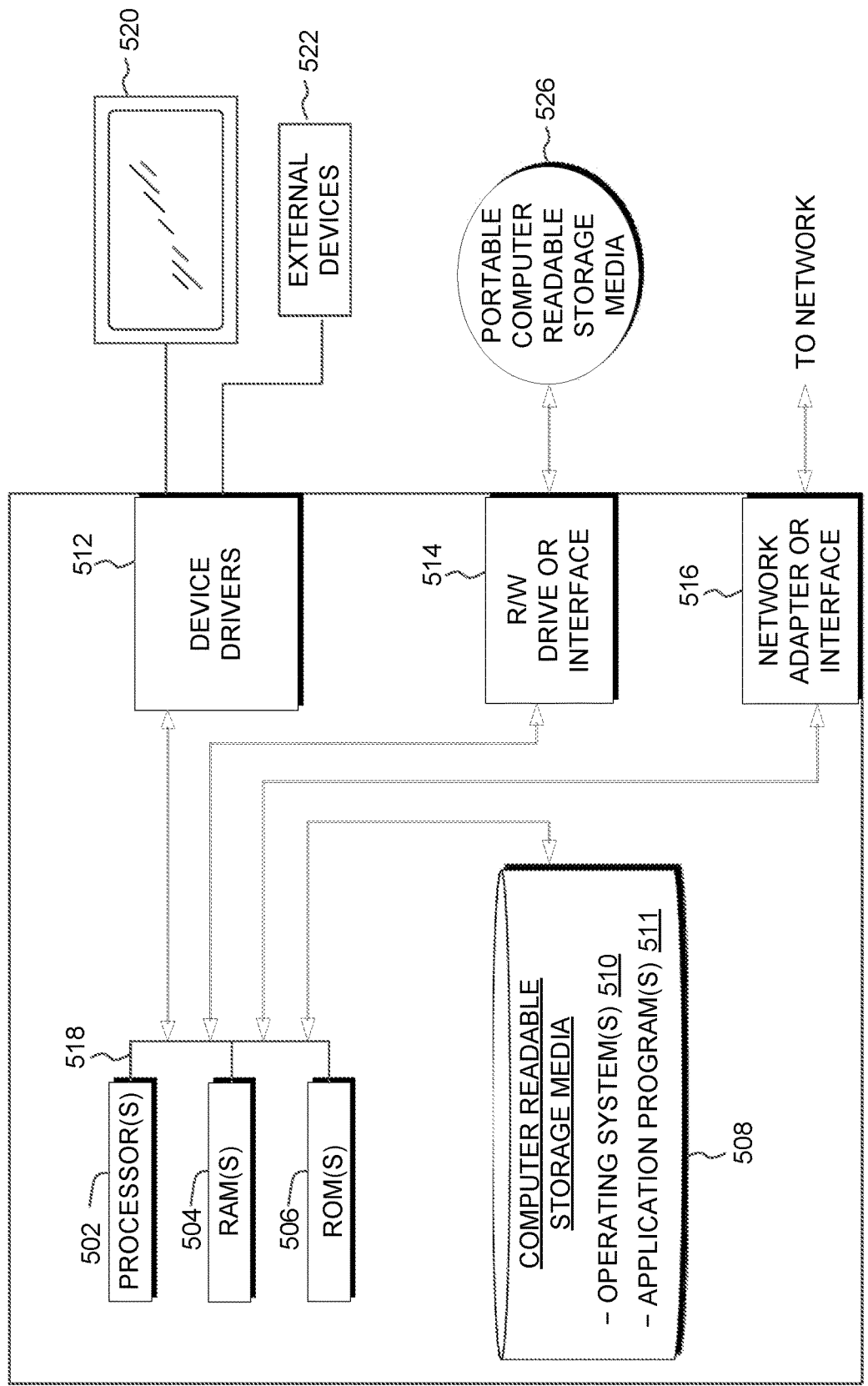
FIG. 5 is a block diagram depicting the hardware components of the identification system of FIG. 1 and the identification system of FIG. 5, in accordance with an embodiment.

FIG. 5 depicts a block diagram of components of computing devices contained in identification system 100 of FIG. 1 and identification system 400 in FIG. 4, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, identification application 122, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
one or more computer-readable memories storing program instructions; and
one or more processors configured to execute the program instructions to cause the computer system to perform operations comprising:
identifying that a first user is utilizing a shared resource during a first time period based on determining that a user activity on the shared resource during the first time period corresponds to a first user activity profile;
monitoring user activity on the shared resource during a second time period, wherein the user activity comprises software usage patterns or processor usage levels;
determining that the first user is no longer utilizing the shared resource based on determining that the user activity associated with the second time period does not correspond to the first user activity profile; and
in response to the determining that the first user is no longer utilizing the shared resource, implementing one or more security measures, wherein the one or more security measures includes:
utilizing natural language processing techniques to analyze information being displayed by an application of the shared resource,
based on the analyzed information, determining that a certain type of first information is being displayed by the application, and
concealing the first information.

2. The computer system of claim 1, wherein the determining that the user activity on the shared resource during the first time period corresponds to the first user activity profile includes identifying that a similarity score corresponding to the user activity during the first time period and the first user activity profile exceeds a threshold score.

3. The computer system of claim 1, wherein the determining that the user activity associated with the second time period does not correspond to the first user activity profile includes:
accessing a database that includes a plurality of user activity profiles;
comparing one or more of the plurality of user activity profiles to the user activity associated with the second time period; and
determining that a similarity score corresponding to a second user activity profile of the one or more of the plurality of user activity profiles and the user activity associated with the second time period exceeds a threshold score.

4. The computer system of claim 1, wherein the user activity further comprises hardware input patterns that comprise: a scrolling speed, a mouse heat map, or a typing speed.

5. The computer system of claim 1, wherein the one or more security measures further includes deleting one or more cookies located on the shared resource.

6. The computer system of claim 1, wherein the one or more security measures further includes automatically logging out of one or more applications that are open.

7. A non-transitory computer-readable medium storing computer-executable instructions, that in response to execution by one or more hardware processors, causes the one or more hardware processors to perform operations comprising:
    identifying that a user activity on a user device during a first time period corresponds to a first user activity profile, the first user activity profile being one of a plurality of user activity profiles corresponding to a plurality of users that each have access to the user device;
    monitoring user activity on a user device during a second time period, wherein the user activity comprises hardware input patterns, software usage patterns, processor usage levels, or time spent on a screen;
    determining that the user activity associated with the second time period corresponds to a second user activity profile, the second user activity profile being another one of the plurality of user activity profiles; and
    in response to the determining that the user activity associated with the second time period corresponds to the second user activity profile, implementing one or more security measures, wherein the one or more security measures includes:
        utilizing natural language processing techniques to analyze information being displayed by an application of the user device,
        based on the analyzed information, determining that a certain type of first information is being displayed by the application, and
        concealing the first information.

8. The non-transitory computer-readable medium of claim 7, wherein the identifying that the user activity on the user device during the first time period corresponds to the first user activity profile includes identifying that a similarity score corresponding to the user activity during the first time period and the first user activity profile exceeds a threshold score.

9. The non-transitory computer-readable medium of claim 7, wherein the determining that the user activity associated with the second time period corresponds to the second user activity profile includes:
    accessing a database that includes the plurality of user activity profiles;
    comparing one or more of the plurality of user activity profiles to the user activity associated with the second time period; and
    determining that a similarity score corresponding to the second user activity profile of the one or more of the plurality of user activity profiles and the user activity associated with the second time period exceeds a threshold score.

10. The non-transitory computer-readable medium of claim 7, wherein the hardware input patterns comprise: a scrolling speed, a mouse heat map, or a typing speed.

11. The non-transitory computer-readable medium of claim 7, wherein the software usage patterns comprise a web browsing pattern.

12. The non-transitory computer-readable medium of claim 7, wherein the one or more security measures further includes deleting one or more cookies located on the user device and automatically logging out of one or more applications that are open.

13. The non-transitory computer-readable medium of claim 7, wherein the one or more security measures further includes adjusting one or more settings to a default setting.

14. A method, comprising:
    identifying that a first user is utilizing a shared resource during a first time period based on determining that a user activity on the shared resource during the first time period corresponds to a first user activity profile;
    monitoring user activity on the shared resource during a second time period, wherein the user activity comprises software usage patterns or processor usage levels;
    determining that the first user is no longer utilizing the shared resource based on determining that the user activity associated with the second time period does not correspond to the first user activity profile; and
    in response to the determining that the first user is no longer utilizing the shared resource, implementing one or more security measures, wherein the one or more security measures includes:
        utilizing natural language processing techniques to analyze information being displayed by an application of the shared resource,
        based on the analyzed information, determining that a certain type of first information is being displayed by the application, and
        concealing the first information.

15. The computer method of claim 14, wherein the determining that the user activity on the shared resource during the first time period corresponds to the first user activity profile includes identifying that a similarity score corresponding to the user activity during the first time period and the first user activity profile exceeds a threshold score.

16. The computer system of claim 14, wherein the determining that the user activity associated with the second time period does not correspond to the first user activity profile includes:
    accessing a database that includes a plurality of user activity profiles;
    comparing one or more of the plurality of user activity profiles to the user activity associated with the second time period; and
    determining that a similarity score corresponding to a second user activity profile of the one or more of the plurality of user activity profiles and the user activity associated with the second time period exceeds a threshold score.

17. The computer system of claim 14, wherein the user activity further comprises hardware input patterns that comprise: a scrolling speed, a mouse heat map, or a typing speed.

18. The computer system of claim 14, wherein the one or more security measures further includes deleting one or more cookies located on the shared resource.

19. The computer system of claim 14, wherein the one or more security measures further includes automatically logging out of one or more applications that are open.

* * * * *